United States Patent
Navale et al.

(10) Patent No.: US 11,262,109 B2
(45) Date of Patent: Mar. 1, 2022

(54) REGENERATION SYSTEM FOR A METAL HYDRIDE HEAT PUMP OF A DAMPER TYPE

(71) Applicant: THERMAX LIMITED, Pune (IN)

(72) Inventors: Devadatta Pundlik Navale, Pune (IN); Amol Jambukumar Bharamgonda, Pune (IN); Sachin Narayan Gunjal, Pune (IN); Ramakrishna Ramanath Sonde, Pune (IN); Sameer Vasudeo Kulkarni, Pune (IN)

(73) Assignee: THERMAX LIMITED, Pune (IN)

( * ) Notice: Subject to any disclaimer, the term of this patent is extended or adjusted under 35 U.S.C. 154(b) by 175 days.

(21) Appl. No.: 16/687,132

(22) Filed: Nov. 18, 2019

(65) Prior Publication Data
US 2020/0080754 A1 Mar. 12, 2020

Related U.S. Application Data

(60) Division of application No. 15/881,150, filed on Jan. 26, 2018, now Pat. No. 10,571,160, which is a
(Continued)

(30) Foreign Application Priority Data

Jul. 30, 2015 (IN) .......................... 2893/MUM/2015

(51) Int. Cl.
*F25B 17/12* (2006.01)
*B60H 1/18* (2006.01)
(Continued)

(52) U.S. Cl.
CPC .......... *F25B 17/12* (2013.01); *B60H 1/00899* (2013.01); *B60H 1/18* (2013.01);
(Continued)

(58) Field of Classification Search
CPC ...... F25B 17/12; F25B 41/20; B60H 1/32014; B60H 1/00899; B60H 1/18; B60H 1/3201;
(Continued)

(56) References Cited

U.S. PATENT DOCUMENTS

| 4,178,987 | A | * | 12/1979 | Bowman | F25B 15/09 |
| | | | | | 165/104.12 |
| 4,185,979 | A | * | 1/1980 | Woolley | F25B 17/12 |
| | | | | | 62/46.2 |

(Continued)

FOREIGN PATENT DOCUMENTS

WO 2005124256 A1 12/2005

*Primary Examiner* — Gordon A Jones
(74) *Attorney, Agent, or Firm* — Cowan, Liebowitz & Latman, P.C.; Mark Montague

(57) ABSTRACT

Envisaged is a regeneration system for a metal hydride heat pump of a damper type. The system comprises a plurality of reactor assembly modules configured to act as a heat pump, an ambient air inlet and a fluid recirculation circuit. The plurality of reactor assembly modules includes first, second, third and fourth metal hydride reactor assembly modules. The fluid recirculation circuit comprises a mixer, a fluid stream switching means, a flow regulating means and an exhaust outlet. The mixer is adapted to mix a portion of a recirculation stream received from the exhaust outlet and the exhaust gas stream to provide a resultant stream. The fluid stream switching means is coupled to the mixer and is adapted to switch flow of the resultant stream as received from the mixer and the ambient air stream in a cyclic manner in a series of half-cycles of operation.

8 Claims, 7 Drawing Sheets

Related U.S. Application Data continuation of application No. PCT/IB2016/054022, filed on Jul. 5, 2016.

(51) Int. Cl.

| | | |
|---|---|---|
| *B60H 1/32* | (2006.01) | |
| *B60H 1/00* | (2006.01) | |
| *F01N 3/02* | (2006.01) | |
| *F02G 5/02* | (2006.01) | |
| *F01N 3/28* | (2006.01) | |
| *F25B 41/20* | (2021.01) | |
| *F01N 5/02* | (2006.01) | |
| *F28D 20/00* | (2006.01) | |

(52) U.S. Cl.
CPC ....... *B60H 1/3201* (2013.01); *B60H 1/32014* (2019.05); *F01N 3/02* (2013.01); *F01N 3/0205* (2013.01); *F01N 3/2892* (2013.01); *F01N 5/02* (2013.01); *F02G 5/02* (2013.01); *F25B 41/20* (2021.01); *F28D 20/003* (2013.01); *F01N 2260/02* (2013.01); *Y02B 30/52* (2013.01)

(58) Field of Classification Search
CPC ........ F01N 3/02; F01N 3/0205; F01N 3/2892; F01N 5/02; F01N 2260/02; F02G 5/02; F28D 20/003; Y02B 30/52
See application file for complete search history.

(56) References Cited

U.S. PATENT DOCUMENTS

| | | | |
|---|---|---|---|
| 4,402,915 A | 9/1983 | Nishizaki et al. | |
| 4,422,500 A | 12/1983 | Nishizaki et al. | |
| 5,408,847 A * | 4/1995 | Erickson | F28D 15/0266 62/478 |
| 5,497,630 A | 3/1996 | Stein | |
| 6,722,154 B1 * | 4/2004 | Tan | B01D 53/265 62/106 |
| 6,949,303 B1 | 9/2005 | Johnson | |
| 6,951,111 B2 | 10/2005 | Chen | |
| 7,097,925 B2 | 8/2006 | Keefer | |
| 7,156,903 B2 | 1/2007 | McCombs | |
| 2002/0112479 A1 | 8/2002 | Keefer | |
| 2004/0142222 A1 | 7/2004 | Yang | |
| 2005/0274138 A1 * | 12/2005 | Golben | B60H 1/00585 62/480 |
| 2005/0274493 A1 * | 12/2005 | Golben | B60H 1/32 165/104.12 |
| 2014/0047853 A1 | 2/2014 | Zhong et al. | |
| 2015/0345836 A1 * | 12/2015 | Yamauchi | F25B 17/12 62/46.2 |
| 2017/0198947 A1 | 7/2017 | Bahar | |

* cited by examiner

REGENERATION SYSTEM FOR A METAL HYDRIDE HEAT PUMP OF A DAMPER TYPE

CROSS-REFERENCE TO RELATED APPLICATION

This application is a divisional of U.S. application Ser. No. 15/881,150, filed Jan. 26, 2018, which is a continuation of International Patent Application No. PCT/IB2016/054022, filed on Jul. 5, 2016; the entire disclosures of which are hereby incorporated herein in their entirety.

FIELD

The present invention generally relates to the Held of thermodynamics.

Particularly, the present invention relates to self-cleaning metal hydride heat recovery systems such as metal hydride heat pumps.

BACKGROUND

In a typical engine, 35-40% of the fuel energy is released in the form of exhaust gas heat, which can be as high as 500-600° C. for high speed engines. Exhaust driven sorption heat pumps, like absorption heat pumps, metal hydride heat pumps, and adsorption heat pumps, are being in use to recover heat from exhaust gases and convert the same to provide cooling and/or heating inside the vehicle. The outlet temperature of the exhaust gas after heat recovery in the heat pump can be up to 200° C.

A major issue in relation to typical metal hydride heat pumps is that ideally, a sorption bed temperature of such a pump is in the range of about 80° C. to 200° C., while an exhaust temperature requirement is of about 100° C. to 250° C. depending on heat rejection temperature and cooling temperature requirements. Further, exhaust gases have dust and soot, which settle on a heat exchanging surface of a beat exchanger of a metal hydride heat pump. Also, when exhaust gases are cooled to temperatures below 250° C. condensation of acid exhaust gas constituents as well as deposits of exhaust gas constituents occur, which leads to the clogging of the heat exchanger, thereby hampering its efficiency. The exhaust gas condensate is corrosive and is produced when the temperature drops below the dew point. This corrosive exhaust gas condensate will eventually produce corrosive effects in components of the metal hydride heat pump such as fins and tube surfaces.

FIG. J illustrates a conventional sorption heat pump 100 for exhaust gas heat recovery. A desorber 3 of the sorption heat pump 100 receives external heat input for desorption of a refrigerant material from a sorbent media. In a typical metal hydride heat pump, hydrogen is used as the refrigerant material while a metal hydride alloy acts as the sorbent media. The desorber 3 receives external heat input in the form of a high temperature exhaust gas. An exhaust gas inlet 1 to the desorber 3 provides exhaust gases from an engine of temperatures up to 500-600° C. This exhaust gas is cooled by the sorbent media, i.e., the metal hydride alloy. A desorber outlet stream 4 of the exhaust gas that is released to the atmosphere via for example a chimney is typically at 100-200° C. The exhaust gas stream passes through a plurality of passes 5 and a number of flow reversals 6 to achieve a better heat transfer rate. In the method as described above, exhaust gases at a high temperature are used directly as input. The arrangement has certain limitations which are as follows.

The direct use of exhaust gases having temperature as high as 300-600° C. can lead to overheating of heat transfer surfaces like tube and tins of the heat exchanger, whereas typical required temperatures for the operation of the heat pump is only 100-250° C. Further, as the metal hydride heat pump operation is cyclic in nature and requires alternate heating and cooling of the heat exchanger and sorption materials in each cycle, overheating of the beat exchanging surfaces results in a higher thermal inertia of metal hydride and the heat pump. Higher thermal inertia is highly undesirable for the performance of the metal hydride heat pump and the adsorption heat pump. The increased thermal inertia reduces cooling capacity and COP (co-efficient of performance) of the whole of the system.

Further, direct use of the exhaust gases results in higher temperature difference of up to 400° C. across the heat exchanger. This results in higher variation in the volumetric flow, hence large variation of velocity of the exhaust gas in the heat exchanger. Tills reduces heat transfer rate, thus resulting in higher size of the heat exchanger.

Furthermore, direct use of the exhaust gases requires several passes to be provided to maintain velocity in the heat exchanger. The exhaust flow quantity is small compared to heat content and a size of the heat exchanger. More the number of passes and flow reversals, higher the pressure drop through the heat exchanger. Further, small quantity of exhaust gases in the heat exchanger having a relatively large size leads to a non-uniform distribution of the exhaust gases over the heal exchanger, which results in reduced performance of the heat exchanger and the whole of the system.

In addition, there is a higher differential expansion in the heat exchanger due to the use of high temperature direct exhaust gases. This may sometimes result in failure of tubes, reducing the reliability of tire heat exchanger and the system itself. Also, there is possibility of thermal creep failure as the whole operation is cyclic and alternates between ambient to exhaust temperature. In conventional systems, a cyclic temperature difference will be typically up to 500° C. and due to a reduced cyclic temperature difference, thermal creep will be higher. This will result in reduced life and lower number of cycles of operation of the system.

Moreover, to construct a heat exchanger that uses high temperature exhaust gases, the material needs to be suitably chosen. This may make the heat exchanger expensive.

Published US patent document US20140047853 discloses a motor vehicle climate control system that implements two heat transfer fluid (HTF) circuits—a add HTF and a hot HTF circuit. Exhaust gas heat recovery is used in the hot HTF circuit for recovering heat and transferring it to an adsorption driven heat pump system. It is to be noted here that implementation of a circuit like this requires additional heat exchangers for a) transferring exhaust gas heat to a heat transfer fluid; and b) rejecting heat of adsorption via the heat transfer fluid to the atmosphere. Use of such circuit for heat transfer also requires additional pumps for circulation of fluid and multiple valves for a changeover of the cycle. This makes the whole system more complex, consuming more auxiliary power and also less reliable due to a number of moving parts. The system will also be bulky and expensive.

Another US published patent document US 20050274493 A1 discloses a metal hydride-based vehicular exhaust cooler that works at about 1000° F. (appx, 600° C.) exhaust heat temperature. This system uses eight valves and a prolonged operation at a high temperature, which leads to thermal inertia and reduced performance. It does not address issues relating to overheating of heat transfer surfaces, higher thermal inertia, and issues related to performance and efficiency.

Thus, there is a need to minimize the dust and soot and increase the overall efficiency as well as better beat transfer rate of heat regeneration module.

OBJECTS

Some of the objects of the present invention, which at least one embodiment satisfies, are described herein below:

It is an object of the present disclosure to ameliorate one or more problems of the prior art or to at least provide a useful alternative.

It is an object of the present invention is to provide an exhaust gas heat recovery system which is efficient in terms of cooling capacity and coefficient of performance as compared to conventional systems.

It is an object of the present invention to provide an exhaust gas heat recovery system having self-cleaning metal hydride regeneration.

It is an object of the present invention to provide an exhaust gas heat recovery system having an improved heat transfer rate.

It is an object of the present invention to provide an exhaust gas heat recovery system that is compact and manageable.

It is an object of the present invention to provide an exhaust gas heat recovery system that is reliable, less expensive and high in efficiency.

It is an object of the present invention to increase the number of cycles of operation of the system and thus the life of the system.

Other objects and advantages of the system of the present disclosure will be more apparent from the following description when read in conjunction with the accompanying figures, which are not intended to limit the scope of the present disclosure.

SUMMARY

Described herein is a regeneration system for a metal hydride heat, pump of a damper type. The system comprises a plurality of reactor assembly modules, an ambient air inlet and a fluid recirculation circuit. The plurality of reactor assembly modules includes a first metal hydride reactor assembly module, a second metal hydride reactor assembly module, a third metal hydride reactor assembly module and a fourth metal hydride reactor assembly module. The first metal hydride reactor assembly module has a regeneration alloy and the second metal hydride reactor assembly module has a refrigeration alloy. The first metal hydride reactor assembly module is coupled to the second metal hydride reactor assembly module for exchange of hydrogen. The third metal hydride reactor assembly module has a regeneration alloy and tire fourth metal hydride reactor assembly module has a refrigeration alloy. The third metal hydride reactor assembly module is coupled to the fourth metal hydride reactor assembly module for exchange of hydrogen. The ambient air inlet is adapted to receive an ambient air stream into the housing to be fed to at least one of the first and the third metal hydride reactor assemblies. The fluid recirculation circuit is configured to recirculate an exhaust stream as received from one of the metal hydride reactor assembly modules. The fluid recirculation circuit comprises a mixer, a fluid stream switching, means, flow regulating means and an exhaust outlet. The mixer is adapted to mix a portion of the recirculation stream and the exhaust stream to provide a resultant stream having a temperature which is intermediate of the temperature of the exhaust stream and the temperature of the recirculation stream. The fluid stream switching means is coupled to the mixer and is adapted to switch flow of the resultant stream as received from the mixer and the ambient air stream in a cyclic manner in a series of half-cycles of operation. In one half-cycle of operation, the resultant stream is fed to the third metal hydride reactor assembly module and the ambient air stream is fed to the fourth metal hydride reactor assembly module. In a subsequent half-cycle of operation, the resultant stream is fed to the first metal hydride reactor assembly module and the ambient air stream is fed to foe second metal hydride reactor assembly module. The flow regulating means is provided downstream of the metal hydride reactor assembly modules. The exhaust outlet is provided for leading away a portion of the recirculation stream from the housing.

In an embodiment, the second anti the fourth metal hydride reactor assembly modules, in the first and the second half-cycles respectively, are coupled to a chamber to be cooled and operate in a hydrogen desorption mode. In an embodiment, the first and the third metal hydride reactor assembly modules, in the first and the second half-cycles respectively, operate in a hydrogen absorption mode and discharge heat of absorption to a stream of ambient air.

In an embodiment, direction of flow of ambient air is opposite to the direction of flow of exhaust gases through each of the first, second, third and fourth metal hydride reactor assembly modules.

In an embodiment, the fluid stream switching means is a fluid flow circuit comprising one 4-port 2 position valve and two 3-port 2 Position valves.

In an embodiment, the fluid stream switching means is a fluid flow circuit comprising two 4-port 2 position valves.

In an embodiment, the flow regulating means is configured to control the flow rate of the recirculation stream in relation to the flow rate of the exhaust stream.

In an embodiment, the first metal hydride reactor assembly module is coupled to the second metal hydride reactor assembly module and the second metal hydride reactor assembly module is coupled to the fourth metal hydride reactor assembly module through a hydrogen tubing.

BRIEF DESCRIPTION OF THE DRAWINGS

The subject matter of the present disclosure will now be explained in relation to the non-limiting accompanying drawings, in which:

FIGS. 7A and 78 illustrate a self-cleaning arrangement in a damper type metal hydride heat pump, in accordance with an aspect of the present disclosure.

DETAILED DESCRIPTION OF THE ACCOMPANYING DRAWINGS

Figure 1:
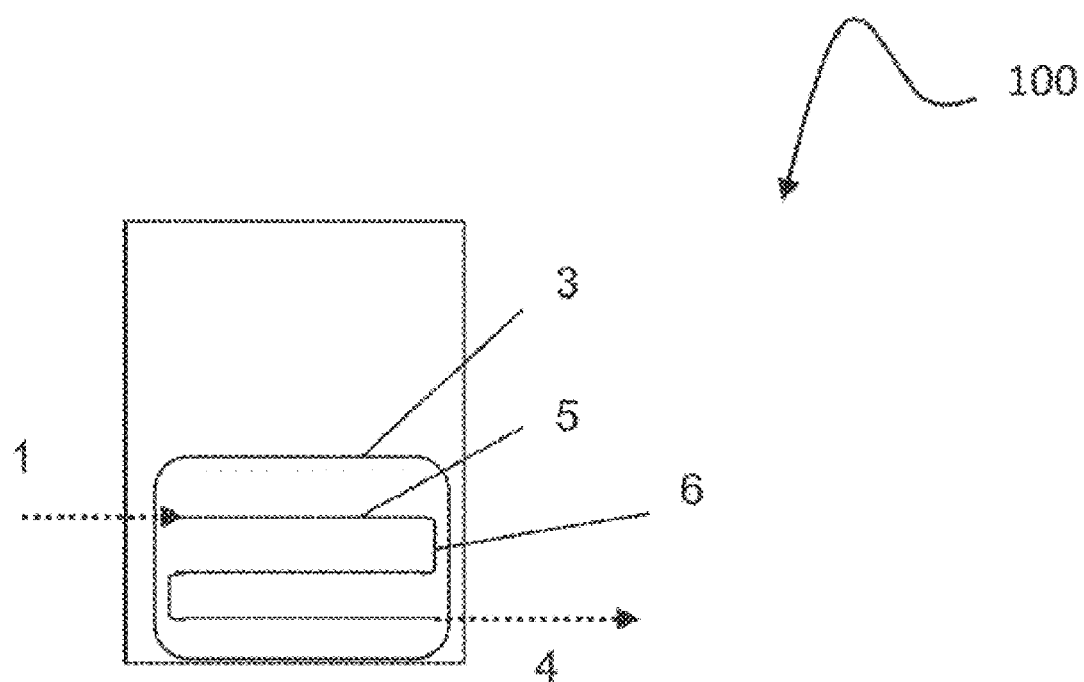
FIG. 1 illustrates a block diagram of conventional sorption heat pump for exhaust gas heat recovery.

An exhaust gas heat recovery system (hereinafter referred to as the 'system') of the present disclosure will now be described with reference to the accompanying drawings which do not limit the scope and ambit of the present disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein am intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The system and/or method as described herein relate to exhaust gas heat recovery using recirculation of exhaust gases. The system is a thermodynamic-mechanical arrangement designed to be used in various applications including waste heat based cooling, heating, refrigeration and air-conditioning.

The system and/or method for exhaust gas heat recovery as proposed herein are based on remixing of exhaust gases, in accordance with an aspect of the present disclosure, inlet high temperature exhaust gases as received from an engine are diluted using an exhaust outlet. A partial flow from the exhaust outlet is re-circulated using a fan and is mixed with the inlet high temperature exhaust gases, which results in exhaust gases having same heat content but a reduced temperature and a higher flow.

Recirculation flow can be decided as per temperature requirement of the system, preferably in a range of 0.1-10 times of exhaust flow. Recirculation rate will be lower if art inlet exhaust temperature is lower or the system requires a relatively higher temperature source. Likewise, recirculation rate will be higher if the inlet exhaust temperature is higher or the system requires a relatively lower temperature source.

Figure 2:
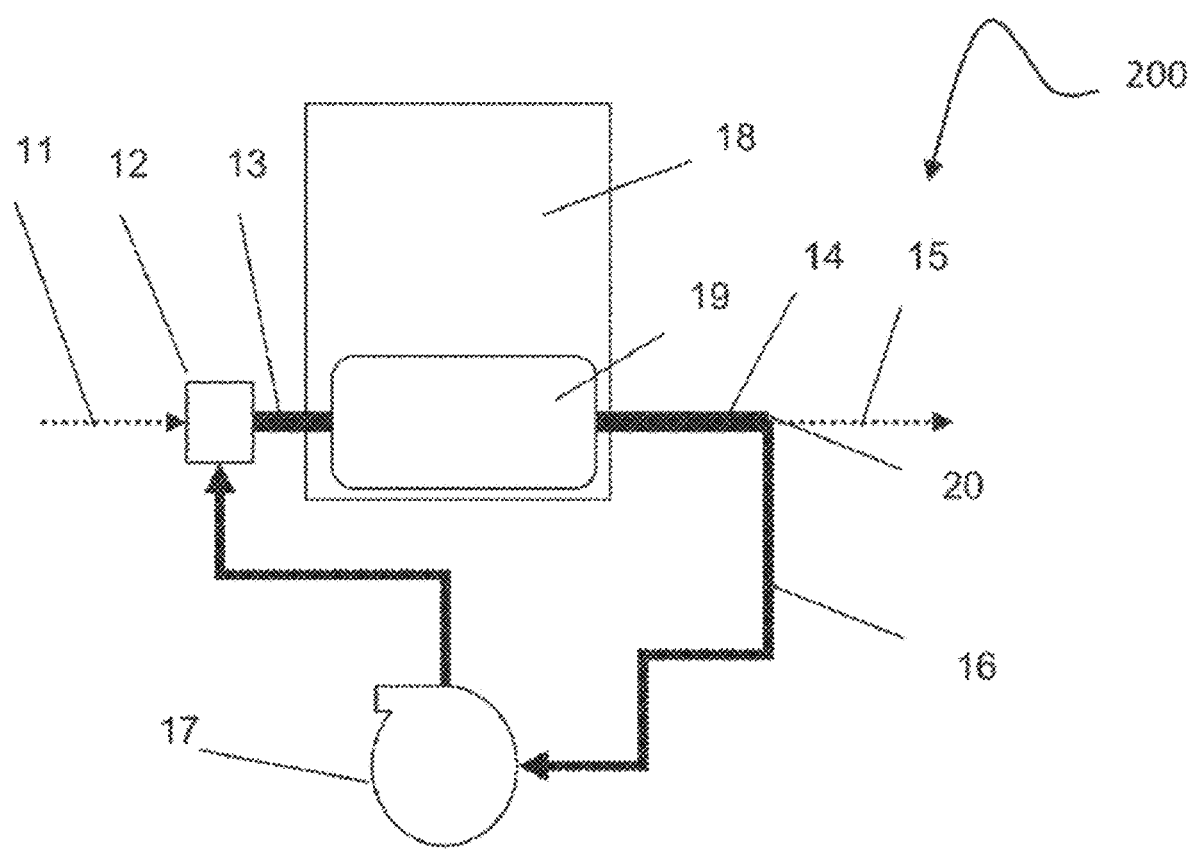
FIG. 2 illustrates a block diagram of an exhaust gas recirculation system, in accordance with an embodiment of the present disclosure.

FIG. 2 illustrates a block diagram of an exhaust gas recirculation system 200, in accordance with an embodiment of the present disclosure. The system 200 consists of a sorption heat pump 18 having a desorber 19 for desorbing a refrigerant material by taking heat from a heat source, such as an engine. A mixer 12 is provided to mix an inlet exhaust stream 11 with a recirculating exhaust gas stream 16 to get a resultant exhaust stream 13 at an intermediate temperature of the two. In an embodiment, the mixer includes a first inlet for receiving the recirculating exhaust stream, a second inlet for receiving the inlet exhaust stream and an outlet adapted to deliver the resultant exhaust stream.

The resultant exhaust stream 13 has the same heat content as that of the inlet exhaust, stream 11 but an increased flow rate and a lower temperature as compared to the inlet exhaust stream 11. The resultant exhaust stream 13 is an inlet condition of exhaust gas to the desorber 19 while a desorber outlet stream 14 is an exhaust gas condition at a desorber outlet. The desorber outlet stream 14 is split into two streams: stream 15 and recirculating exhaust stream 16 also referred as "recirculating exhaust gas stream 16"). While the stream 15 is rejected to the atmosphere from an exhaust outlet 30, for example, a chimney, the remaining, i.e., the recirculating exhaust stream 16 is re-circulated back to the mixer 12. For the purpose, a flow regulating means is provided, which includes, for example, a recirculation fan 17. The flow regulating means is also adapted to compress the recirculating exhaust stream 16 to a mixer pressure.

As can easily be appreciated from the figure, a mass flow of the resultant exhaust stream 13 is equivalent to the sum of mass firms of the inlet exhaust stream 11 and the recirculating exhaust stream 16. Also, the mass flow of the resultant exhaust stream 13 is equivalent to the desorber outlet stream 14, which is in turn equivalent to a sum of mass flows of the streams 15 and recirculating exhaust stream 16.

Due to the mixing of recirculating exhaust gas with the inlet exhaust gas in a mixer, a temperature of resultant exhaust gas gets reduced. Also, the resultant exhaust flow after the mixing gets higher as compared to the inlet exhaust gas stream 11 as received from the engine.

For an inlet exhaust stream 11 (also referred as "inlet exhaust gas stream 11") provided in the range of 300-600° C., the recirculating exhaust stream 16 is measured to be at 100-250° C. with a flow rate 3 times that of the inlet exhaust stream 11. In the process, a temperature of the resultant exhaust stream 13 gets reduced to about 120-300° C. The desorber outlet stream 14 in this ease is having temperature of about 150° C.

The proposed system and/or method of exhaust recirculation solves the drawbacks of the conventional systems/arrangements as in the case of the exhaust recirculation as proposed herein, the temperature entering a desorber of the sorption pump, such as a metal hydride heat pump, is now reduced to the range of 100-250° C. as compared to 500-600° C. in convention direct exhaust gas intake. This intake temperature is much lower than the intake temperature of the exhaust entering the metal hydride heat pump in a conventional arrangement. This avoids overhearing of a heat transfer surface of a heat exchanger of the metal hydride heal pump.

Further, as operation of metal hydride heal pump is cyclic in nature, with alternate heating and cooling of the heat exchanger (also referred to as the 'reactor') in a cycle, lower temperature of die heat transfer surface results in reduced thermal inertia of the whole of the system, which not only improves the performance of the system, hut also enhances cooling capacity and COP.

Further, in the present, system and/or method, a temperature difference across an inlet and an outlet of the heat exchanger gets reduced typically in the order of 20-100° C.

Hence, volumetric flow difference between the inlet and the outlet is substantially lower compared to the conventional system and or method. Tins results in uniform velocities of the exhaust gas, resulting in improved heal transfer rate.

Furthermore, in the present system and/or method, an exhaust gas flow at the inlet of the heat exchanger is higher compared to the conventional system and/or method. Owing to this, reduced number of passes or single pass can be implemented in the heat exchanger, which in turn results in reduced pressure drop in the heat exchanger. This also results in better distribution of the exhaust gas over the heat transfer surface. Further, as a temperature difference across the heat exchanger is lower, chances of thermal creep/expansion are also reduced, thus resulting in improved reliability and a longer life of the system.

Moreover, as the heat exchanger now operates at a maximum temperature of about 250° C., conventional cost effective materials like carbon steels, aluminum, stainless steels, and copper can be used for the construction of the heat exchanger.

In addition to this, the present system and or method allows for the implementation of a cleaning mechanism by means of a construction of a regeneration module of the reactor carrying the metal hydride sorbent media to clean off exhaust gas constituents such as dust, soot and exhaust gas condensates that are deposited on operative surfaces of the regeneration module.

Figure 3:
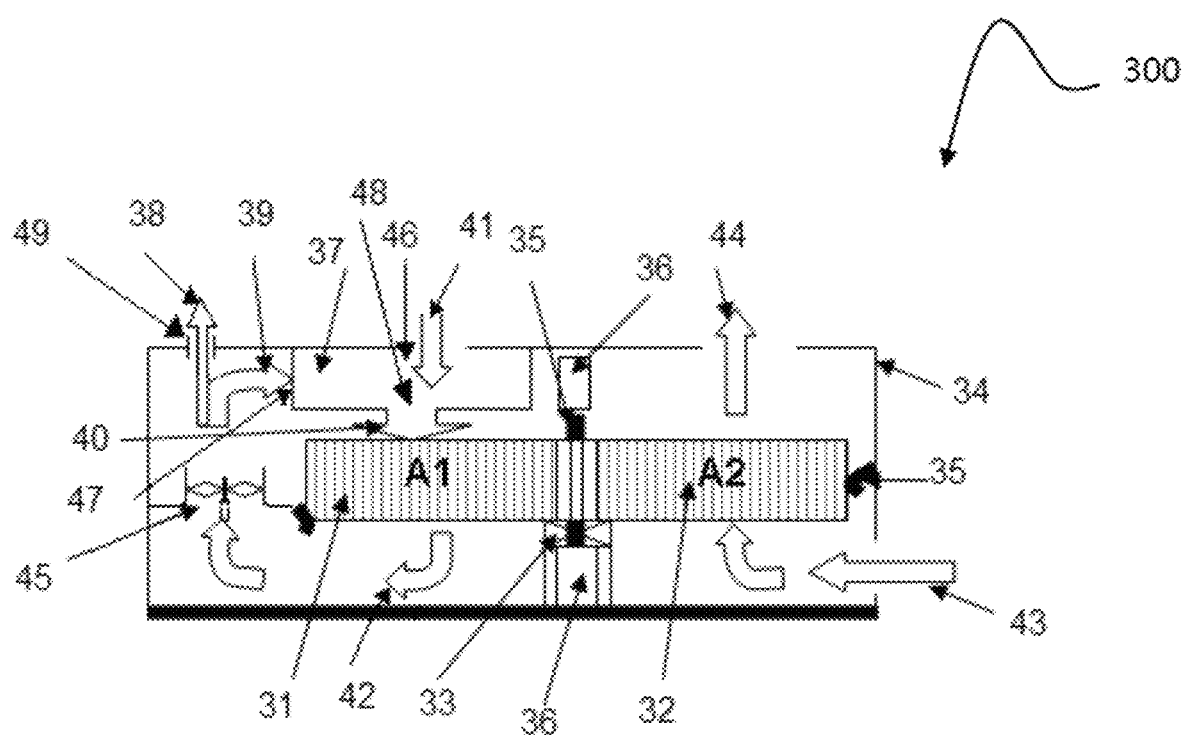
FIG. 3 illustrates an arrangement for heat recovery from exhaust gas recirculation system in a rotating type metal hydride heat pump, in accordance with an embodiment of the present disclosure.

FIG. 3 illustrates an arrangement 300 for heat recovery from exhaust gas recirculation system 200 in a rotating type metal hydride heat pump, in accordance with an embodiment of the present disclosure. The arrangement 300 includes a first reactor assembly module 31 or A1 and a second reactor assembly module 32 or A2, each having regeneration alloy material, such as high temperature metal hydride, and an fluid changeover mechanism. Changeover of various fluid streams during a cycle change is done by rotating the reactor assembly modules 31 and 32. For the purpose, a fluid stream switching means is provided in tire form of a rotating bearing assembly 33 having a drive mechanism on which the reactor assembly modules 31 and 32 are mounted.

The reactor assembly modules 31 and 32 are enclosed in a housing 34 along with a mixer 37. The housing 34 is provided for compartmentalizing, and guiding hot air/reject exhaust gas streams 41, 38, 42, 39, 40 and ambient air streams 43, 44.

One or more flexible seals 35 and non-flexible seals 36 are provided to form two compartments, each housing one reactor assembly module. The seals 35 and 36 are provided in the corresponding air changeover system and form compartments in stationary as well as rotating conditions of the reactor assembly modules 31, 32. Further, the arrangement 300 consists of a flow regulating means such as a recirculation fan 45 (also referred as "fan 45") downstream of the reactor assembly modules for compressing the cooled resultant gas stream from an outlet of the reactor assembly module 31.

The re-circulating exhaust gas has an average temperature of about 80-250° C. depending on the process requirement and a recirculation rate. The recirculation rate is defined as the ratio of a re-circulating gas stream 39 to an inlet exhaust stream 41 (also referred as "inlet exhaust gas stream 41"). The recirculation rate can vary from 0.1 to 10 depending on the requirement of the system. A lower circulation rate will result in higher temperature resultant exhaust gas stream 40, whereas a higher recirculation rate will result in lower temperature resultant exhaust gas stream 40.

A part of the compressed cooled resultant gas stream 42 (which is equal to the mass flow of the inlet exhaust stream 41 from a fan outlet) is released to the chimney/atmosphere. In one embodiment, an exhaust outlet 49 to chimney/atmosphere can be from fan suction to atmosphere instead of from fan outlet, i.e. the exhaust outlet 49 may be positioned upstream of the fan 45 instead of downstream. A balance re-circulated gas stream 39 is mixed with the inlet exhaust stream 41 at high temperature in the mixer 37. The inlet exhaust gas stream 41, which is heat source at high temperature up to 500° C., can be from an exhaust of an engine.

The inlet exhaust gas stream 41 and the re-circulated gas stream 39 get mixed in the mixer 37 to form a uniform mixture of the resultant exhaust gas stream 40 having a temperature intermediate of the two. The resultant exhaust gas stream 40 of the mixer 37 flows over the reactor assembly module 31. The resultant exhaust gas stream 40 has a temperature of about 300° C. and a flow rate of up to 11 times of the inlet exhaust stream 41. This exhaust gas temperature is suitable for the efficient performance of the system. The heat of the resultant exhaust gas stream 40 gets transferred to the reactor assembly A1, where the metal hydride desorbs the hydrogen pan of the exhaust. In the process, the temperature of die resultant exhaust gas gets reduced and the cooled resultant gas stream 42 is fed to the suction of the fan 45.

In the first half of the cycle, the resultant exhaust gas flows over the reactor assembly module A1 while in the second half, the resultant exhaust gas flows over the reactor assembly module A2. A cycle changeover from the first cycle to the second cycle and vice-a-versa is done by the rotating hearing assembly 33 by 180° C. about a central rotating axis. The rotating bearing assembly 33 uses a drive mechanism to rotate the reactor assembly modules A1 and A2.

In operation, the mixer 37 mixes an inlet exhaust gas stream 41 from a first inlet 46 and a re-circulated gas stream 39 from a second inlet 47 to form the resultant exhaust gas stream 40 which exits from a resultant outlet 48.

The reactor assembly module 31 coupled to the resultant outlet 48 acts as a desorption unit and converts the resultant exhaust gas stream 40 into a cooled resultant gas stream 42. The exhaust outlet 49 is placed in the path of flow of the cooled resultant gas stream 42 such that a portion of the cooled resultant gas stream 42, hereinafter referred to as reject exhaust gas stream 38, is rejected out of the housing 34 and the remainder of the cooled resultant gas stream 42, which is tire re-circulated gas stream 39 as referred to earlier, continues to travel along its path back to the mixer 37.

The resultant exhaust gas stream 40 after passing over the reactor assembly module 31, is split into the re-circulated gas stream 39 and the reject exhaust gas stream 38. The splitting of the cooled resultant gas stream 42 is done by providing a controlled opening/closing of the exhaust outlet 49 for the reject exhaust gas stream 38 provided in the housing 34. The opening or closing of the exhaust outlet 49 provided is such that a flow through it is unidirectional and any change in the flow of the inlet exhaust gas stream 41 results in a change in pressure at the fan 45 suction and discharge. Via the exhaust outlet 49, this change in pressure matches with the reject exhaust gas stream 38 to the inlet exhaust gas stream 41 pressure difference, and mass balance is thus ensured.

Further, a speed of the fan 45 can be varied to control a fan discharge flow and a recirculation rate. By varying the recirculation rate, the temperature of the resultant exhaust gas stream 40 can be controlled. In ease of a lower inlet exhaust gas temperature, the fan speed is reduced to get a lower recirculation rate. A reduced recirculation rate results in maintaining a constant resultant exhaust gas temperature.

Further, the exhaust outlet 49 can be placed after the fan 45. i.e., at a fan outlet; or before tire fan. i.e., at a fast suction. In the first ease, a flow handled by the fan 45 is the sum of the reject flow and the re-circulated flow. This arrangement 300 allows the exhaust gas recirculation system 200 to operate at lower pressures and thus a fan suction pressure can be slightly below the atmospheric pressure. In this arrangement 300, the reject exhaust is blown out with the maximum pressure generated inside the system 200. In the second case, a fan flow rate is same as the recirculation flow, which results in reduced fan power consumption. This requires operation of the exhaust gas recirculation system 200 to be at above the atmospheric system. In this arrangement, the reject exhaust is blown out of the system with the lowest pressure in the system 200.

Figure 4:
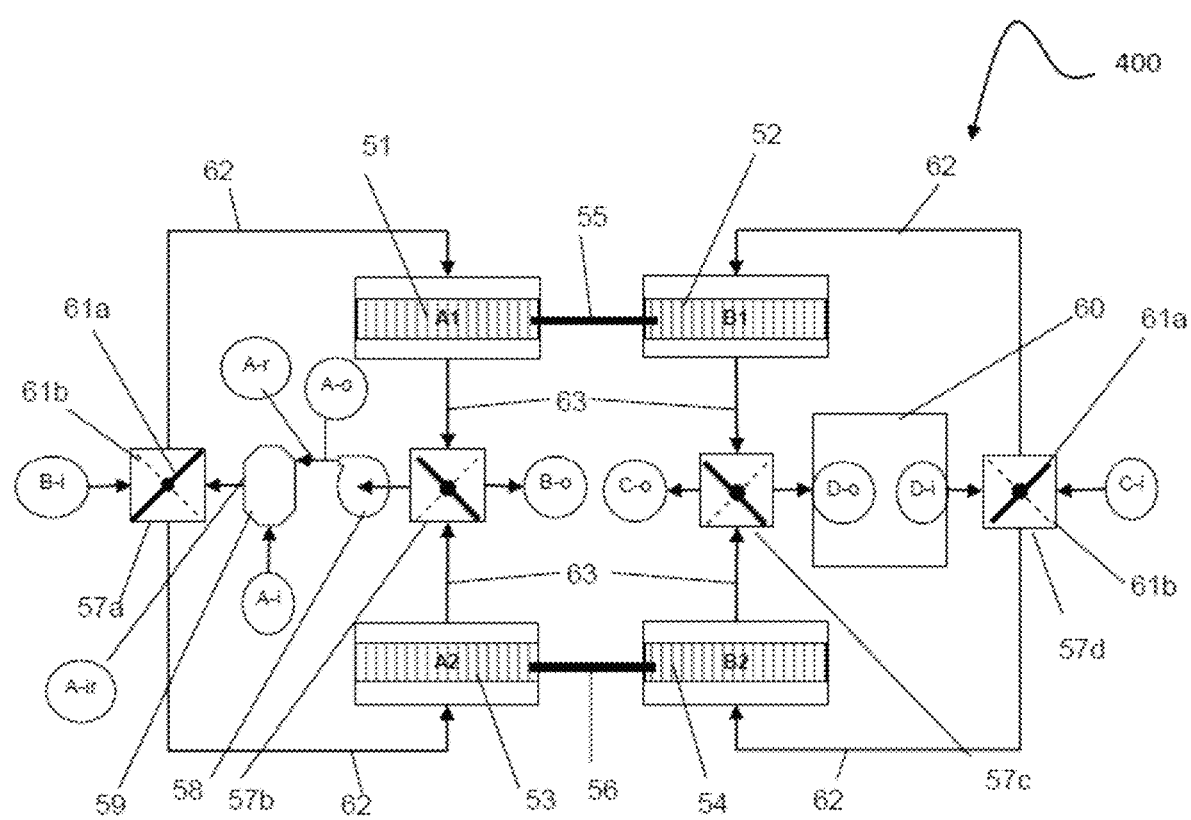
FIG. 4 illustrates an arrangement for heat recovery from exhaust gas recirculation system in a damper type metal hydride heat pump, in accordance with an embodiment of the present disclosure.

FIG. 4 illustrates an arrangement 400 for heat recovery from exhaust gas recirculation system in a damper type metal hydride heat pump, in accordance with an embodiment of the present disclosure.

As shown, a first reactor assembly module 51 or A1 having a regeneration alloy is coupled from a hydrogen gas side to a second reactor assembly module 52 or B1 having a refrigeration alloy. The two modules 51 and 52 are connected to each other through a hydrogen tubing 55. Further, a third reactor assembly module 53 or A2 having a regeneration alloy is coupled from hydrogen gas side to a fourth reactor assembly module 54 or B2 having a refrigeration alloy. These two modules 53 and 54 are connected to each through another hydrogen tubing 56.

Further, four electromagnetic/electro-pneumatic damper valves 57a, 57b, 57c, 57d, collectively referred to as damper valves 57, each having four ports and two positions are used for the changeover of a heat transfer fluid/air streams over the reactor modules 51, 52, 53 and 54 in pre-determined, cyclic manner.

A Hap position 61a of the damper valves 57 provides for a first half-cycle, such that the reactor modules B1 and A2 act in a desorption mode while 112 and A1 in an absorption mode, further, a flap position 61b of the damper valves 57 provides for a second half cycle, such that A1 and B2 act in a desorption mode while B1 and A2 act in an absorption mode.

In the first half cycle of operation, the rector assembly A2 is in the process of desorption of hydrogen using a resultant exhaust gas stream (A-ir) having an intermediate temperature of about 300° C. Hydrogen released by the reactor assembly A2 is absorbed by the reactor assembly B2 while the heat of absorption is released to the environment as an air stream (C-i) The resultant exhaust gas stream (A-ir) flows via a first damper valve 57a and an inlet ducting 62 to the reactor assembly A2.

In the hydrogen desorption process by the reactor assembly module A2, the resultant exhaust gas stream (A-ir) gets cooled to an average temperature of 200° C. The cooled-down resultant exhaust gas stream (A-ir) received at an outlet of the reactor assembly A2 flows to a suction side of a re-circulating, fan or blower 58 via another outlet damper valve 57b. The recirculating fan or blower 58 is configured to handle high temperatures up to a range of 500° C. The re-circulating fan or blower 58 compresses the cooled-down resultant exhaust gas stream (A-ir) to a pressure higher than a mixer 59 that follows the re-circulating fan or blower 58. A pan of the compressed exhaust gas (A-o), which is equal to the mass flow of an inlet exhaust gas stream (A-i), from an outlet of the re-circulating fan or blower 58 is released to the atmosphere. In one embodiment, the exhaust gas outlet to the atmosphere can be provided from a suction side of the re-circulating fan or blower 58 instead of from the fan outlet.

Further, the remaining flow of the exhaust gas (A-r) is mixed with the inlet exhaust gas stream (A-i), which is received at a high temperature of about 500° C., in the mixer 59. The inlet exhaust gas stream (A-i), which acts as the heat source, is provided, from example, from an exhaust of an engine. The inlet exhaust gas stream (A-i) and the remaining, recirculated exhaust gas stream (A-r) get mixed in the mixer 59 to form a uniform mixture of resultant exhaust gas (A-ir) having an intermediate low temperature. The recirculation rate can vary from 0.1 to 10 depending on the requirement of the system.

In the hydrogen adsorption process lit the reactor assembly B2, the heat of absorption is released to the atmosphere in the form of an ambient air stream (C-i), as mentioned earlier. The ambient air stream (C-i) is connected to the reactor assembly B2 via an inlet damper valve 57d and inlet ducting 62. In the first half cycle of operation, the rector assembly B1 is in the process of desorption of hydrogen using a low temperature source in the form of a return air stream (D-i) from the chamber 60, i.e., the enclosure to be cooled. The hydrogen released by the reactor assembly B1 is absorbed by the reactor assembly A1 in the first half cycle and the heat of absorption is released to the ambient air stream (B-i). During this process, the return air stream D-i gets further cooled to a temperature lower than a cold supply stream (D-o) to the chamber 60.

During the second half cycle, the reactor assembly A1 is in process of desorption of hydrogen using the resultant air stream (A-ir). The desorbed hydrogen is absorbed by the reactor assembly B1 and the heat of absorption is rejected to the atmosphere, through the ambient air stream (C-i). Also, the reactor assembly B2 is in the process of hydrogen desorption using a low temperature source in the term of return air (D-i) from the chamber 60. The desorbed hydrogen is absorbed by the reactor assembly A2 and the heat of absorption is rejected to an ambient air stream (B-i). During this process, the return air stream (D-i) gets further cooled to a temperature lower than a temperature of the cold supply stream (D-o) to the chamber 60.

Figure 5:
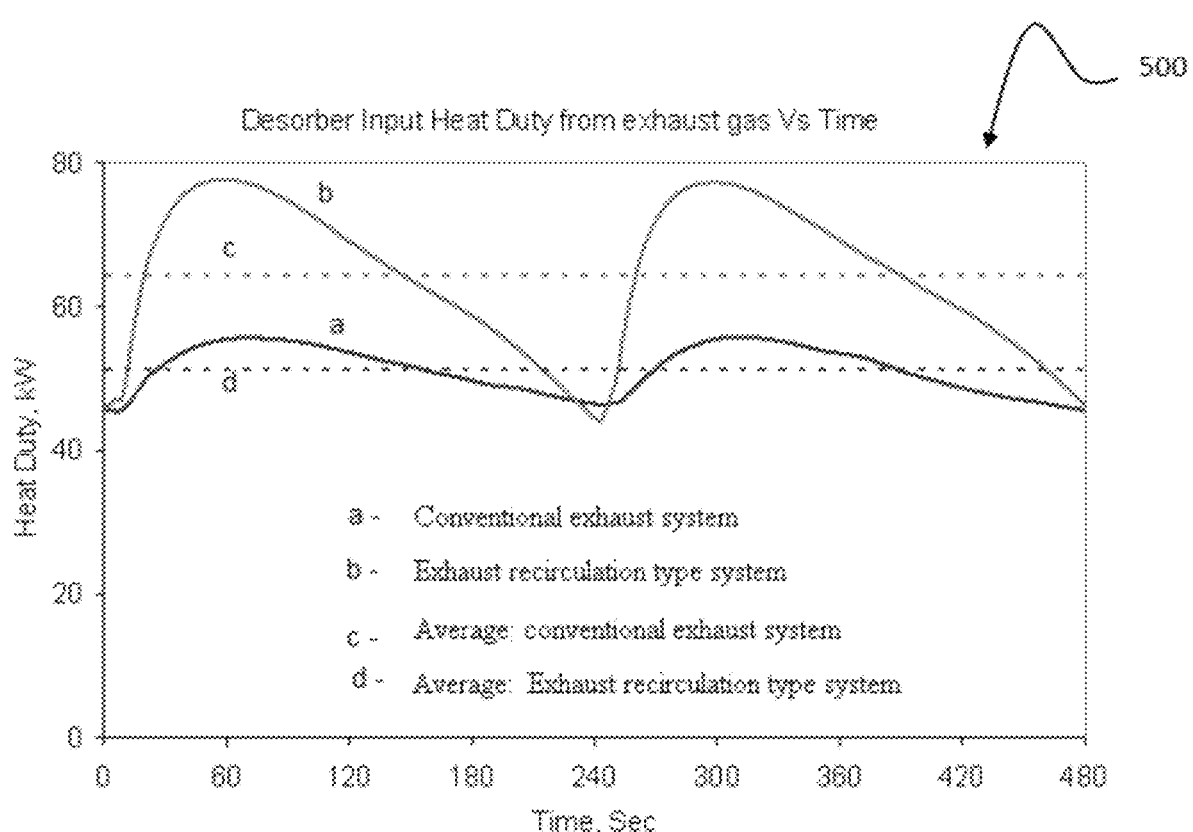
FIG. 5 illustrates a graph showing a desorber input heat duty from exhaust gases over time for a conventional exhaust system versus that of a heat pump having the system as described herein.

FIG. 5 illustrates a graph showing a desorber input heat duty from exhaust gases over time for a conventional exhaust system (referring to plots a and c) versus that of a heat pump having the system as described herein (referring to plots b and d). As is clear from the plots, the exhaust recirculation type system has a relatively low average desorber input heat duty from exhaust gas for a predetermined time period for desorbing same quantity of hydrogen.

Figure 6A:
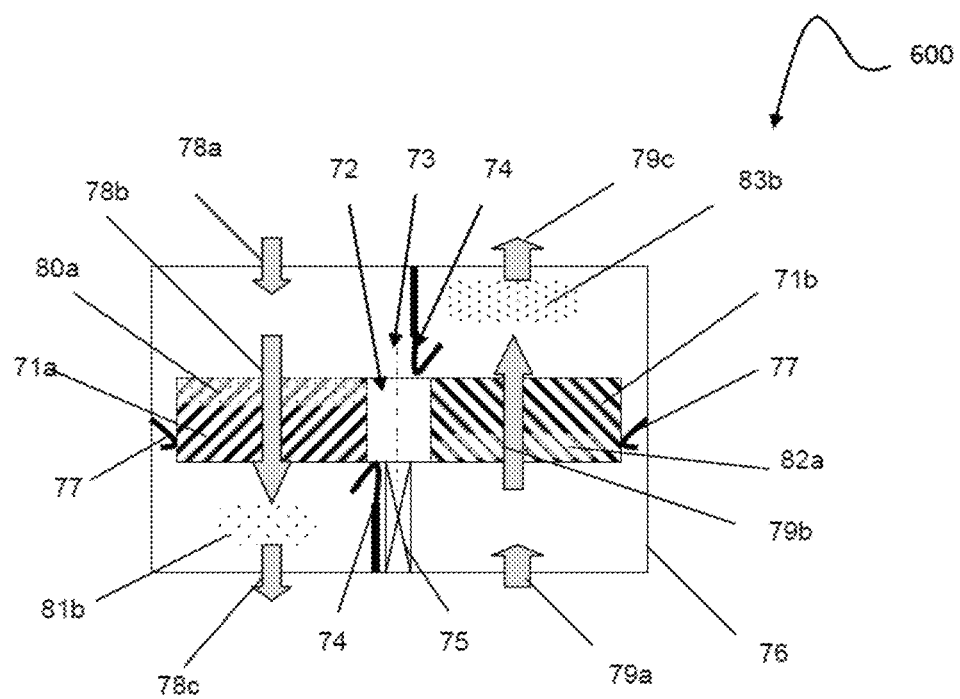
FIGS. 6A and 6B illustrate a self-cleaning arrangement in a rotating reactor type metal hydride heal pump, in accordance with an aspect of the present disclosure.
Figure 6B:
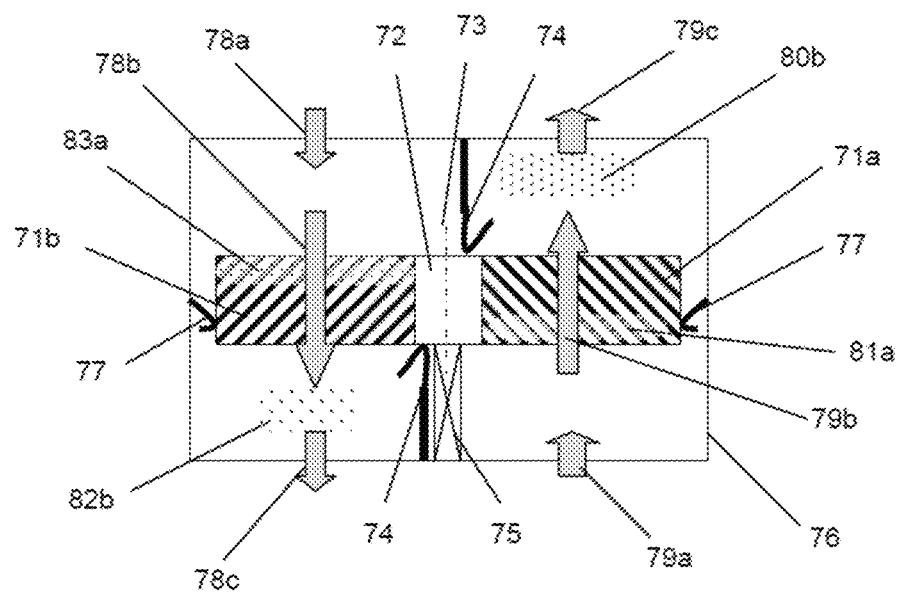

FIGS. 6A and 6B illustrate a self-cleaning arrangement 600 in a rotating reactor type metal hydride heat pump, in accordance with an aspect of the present disclosure. In particular, FIG. 6A shows a reactor assembly position in the first half cycle of operation and FIG. 6B shows the reactor assembly position during the second half cycle in a rotating type metal hydride heat pump.

The self-cleaning arrangement 600 shows reactor assemblies 71a and 71b, each containing regeneration/high temperature metal hydride. The reactor assemblies 71a and 71b can be fin-tube type heat exchanger having a metal hydride filled inside the tabes and a heat transfer medium flowing over the fins.

The self-cleaning arrangement 600 is constructed such that it is divided into two thermally insulated compartments, each containing a reactor assembly, and two different heat transfer fluids flow through each compartment, simultaneously, in one half cycle, in a direction opposite to that of the other. In other words, the constituents of the exhaust gas stream like dust and soot deposited on the surface of one reactor assembly, in one half cycle, are blown away in a subsequent half cycle using ambient an stream flowing through the corresponding compartment in an opposite direction to that of the exhaust gas stream.

The reactor assemblies 71a and 71b are enclosed in a thermally insulated housing 76 and are separated from another using a thermally insulated partition 72. The reactor assemblies 71a and 71b are mounted on a bearing assembly 75 having a drive mechanism to rotate the reactor assemblies 71a and 71b around an axis of rotation 73 during operation.

The housing 76 is provided to form two thermally insulated compartments, each having one reactor assembly and a different heat transfer fluid. In an embodiment, partition flexible seals 74 are mounted on the housing 76 along a diameter of each reactor assembly to avoid mixing of the heat transfer fluids from the two compartments during stationary and/or rotating conditions. The partition flexible seals 74 are provided above and below the reactor assemblies 71a and 71b. Further, peripheral flexible seals 77 are mounted on the perimeter of housing 76 to avoid bypassing of the heat transfer fluids while flowing over the reactor assemblies 71a and 71b during rotating, and/or stationary conditions.

Further, as shown, one heat transfer fluid 78a is an inlet exhaust gas strewn having few ppm level particulate matter/soot 80a and 83a. In addition, this inlet exhaust gas stream contains condensates of exhaust gas constituents such as acidic gas condensates. Further, another heat transfer fluid 79a is an inlet ambient ah stream, which may contain ppm level dust particles 81a and 82a. Further, an exit exhaust gas stream is shown by 78c. A direction of flow of the exhaust gas stream over the reactor assemblies 71a and 71b during the first and the second half cycles is shown by 78b. Likewise, an exit ambient steam is shown by 79c. A direction of flow of the ambient air stream over the reactor assemblies 71a and 71b during the first and the second half cycle is shown by 79b.

As will be easily appreciated, a soot particle quantity in the exhaust gas is normally higher compared to the ambient air. Hence, a How rate of ambient air is always kept more than the exhaust gas flow. This enables cleaning of a comparatively higher quantity of soot particles that is deposited on the reactor surface during one half-cycle in one compartment using a high flow rate of ambient air flowing inside the other compartment, in an opposite direction in comparison to the exhaust flow direction, in the next half cycle.

The soot particles settled on an entry of the reactor assembly 71a in the first half cycle is shown by reference numeral 80a (referring to FIG. 6A). These particles (shown as 80b, FIG. 6B) are posited out by the ambient air stream 79b, which has a flow direction opposite that of the exhaust gas flow direction 78b.

Likewise, the soot particles settled on an entry of the reactor assembly 71b in the second hall cycle is shown by reference numeral 83a. These particles (shown as 83b) are pushed out by tire ambient air stream 79b, which has a flow direction opposite that of the exhaust gas flow direction 78b.

Reference numeral 81b shows dust particles pushed out by the exhaust gas flow 78c of the reactor assembly 71a, in relation to FIG. 6A. These dust particles (81b) were settled on the reactor assembly during a previous half cycle and are shown as 81a, in relation to FIG. 6B. Here, the dust settled on reactor assemblies is pushed out by the exhaust gas stream having a direction 78b, which is opposite to that of the ambient air flow, shown as 79b.

Likewise, reference numeral 82b shows dust particles pushed out by the exhaust gas flow out 78c of the reactor assembly 71b. The dust panicles (82b) get settled on the reactor assembly during a previous half cycle, shown by 82b. Here, the dust settled on reactor assemblies is pushed out by the exhaust gas stream having a direction 78b, which is opposite to that of the ambient air flow 79b.

The partition flexible seals 74 provided above and below the reactor assemblies 71a and 71b are adapted to provide contact with a reactor assembly's surface, such that ft assists in the cleaning of the dust/soot panicles settled on each reactor assembly. A loose end of the partition flexible seals 74 remains in contact with the reactor assemblies during rotation and helps loosen the soot/dust particles settled on the reactor surface after every half-cycle. The loosened particles of soot/duct are carried out by the ambient air and/or the exhaust gas stream respectively, as described earlier. In a similar manner, condensates are also cleaned off from the reactor assemblies.

Figure 7A:
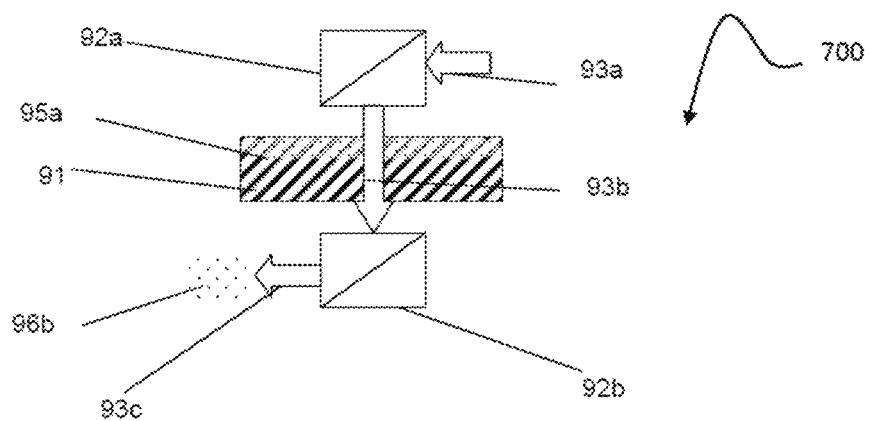
Figure 7B:
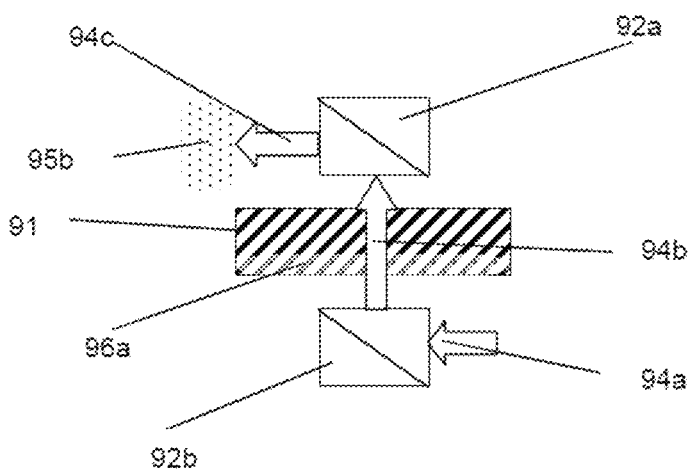

FIGS. 7A and 7B illustrate a self-cleaning arrangement 700 in a damper type metal hydride heat pump, in accordance with an aspect of the present disclosure.

In particular, FIG. 7A shows a reactor assembly 91 of a damper type metal hydride heat pump with the exhaust gas stream acting as tire heat transfer fluid containing ppm level soot particles in the first half cycle, while FIG. 7B shows the reactor assembly 91 with the ambient air stream acting as the heat transfer fluid containing ppm level soot particles in the second half cycle.

The reactor assembly 91 contains a regeneration/high temperature metal hydride alloy. The reactor assembly 91 includes a set of air valves 92a and 92b adapted to switch the heat transfer fluids alternatively after each half cycle. In relation to FIG. 7A, an inlet exhaust gas stream 93a provided to the reactor assembly 91 via the air valve 92a flows over the reactor assembly 91 in the first half cycle and exits as an outlet exhaust stream 93c via an air valve 92b. The exhaust flow direction over the reactor assembly 91 is shown by 93b. Further, in relation to FIG. 7b, an inlet ambient air stream 94a provided to the reactor assembly 91 via the air valve 92b flows over the reactor assembly 91 in the second hall cycle. The inlet ambient air stream 94a exits the reactor assembly 91 as an outlet ambient air stream 94c via the air valve 92a. The ambient air flow direction over the reactor assembly 91 is shown by 94b.

During live first half cycle of operation, soot panicles get settled on an entry of the reactor assembly 91 (shown by 95a). The exhaust gas stream flowing through the reactor assembly 91 carries the soot particles out of the reactor assembly 91 (shown by 96b), which were settled from the ambient air stream in the previous half cycle shown by 96a. The exhaust gas stream 93b is adapted to flow in a direction over the reactor assembly 91 opposite to that of ambient air stream 34b. This helps removal of the dust/soot particles out of the reactor assembly 91 via the air valve 92b.

During the second half cycle of operation, the soot particles settled in a previous cycle 95a at the entry of the reactor assembly are pushed out by the ambient air flow, shown by 95b via the air valve 92a in the same manner as described above.

In each of the ease discussed with reference to FIG. 6 (collectively) and FIG. 7 (collectively), the configuration of the other essential features of the heat recovery system will be similar to the ones discussed with reference to FIGS. 2 to 4. For example, the embodiments discussed in the FIGS. 6 and 7 also have a recirculation circuit as discussed in the FIGS. 2 to 4. Further, a mixer is provided as part of the recirculation circuit to mix a recirculation stream with an exhaust gas stream coming from an exhaust source such as an engine. In an embodiment, the mixer is positioned within any one of the two thermally insulated compartments itself.

Soot particle quantity in the exhaust gas is normally higher as compared to the dust quantity in the ambient air. Hence, a flow rate of ambient air is kept more than that of the exhaust gas flow. This enables cleaning of soot particles, which are higher in quantity, from a reactor surface in a next half cycle fry the ambient air flow having an opposite direction when compared to the exhaust flow direction.

As can be appreciated by the a person skilled in die art, the present recirculation based self-cleaning arrangements am not limited to metal hydride heat pumps and can also be used for exhaust heat driven adsorption heat pump, lithium bromide-water absorption heat pumps, and ammonia water absorption heat pumps also.

Technical Advancements and Economical Significance

The technical advancements offered by the heat transfer system of the present disclosure include the realization of:
Improved reliability of the system.
Compact and manageable system.
Improved heat transfer rate.
Efficient self-cleaning of the reactor assemblies.

Throughout this specification the word "comprise", or variations such as "comprises" or "comprising", will be understood to imply the inclusion of a stated element, integer or step, or group of elements, integers or steps, hut not the exclusion of any other element, integer or step, or group of elements, integers or steps.

The use of the expression "at least" or "at least one" suggests the use of one or more elements or ingredients or quantities, as the use may be in the embodiment to achieve one or more desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the various components of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the an from the disclosure herein, whereby it is to be distinctly understood that the foregoing descriptive matter is us be interpreted merely as illustrative of the invention and not as a limitation.

The invention claimed is:

1. A regeneration system for a metal hydride heat pump of a damper type, said system comprising:
a plurality of reactor assembly modules including a first metal hydride reactor assembly module, a second metal hydride reactor assembly module, a third metal hydride reactor assembly module and a fourth metal hydride reactor assembly module;
said first metal hydride reactor assembly module having a regeneration alloy and said second metal hydride reactor assembly module having a refrigeration alloy, said first metal hydride reactor assembly module coupled to said second metal hydride reactor assembly module for exchange of hydrogen;
said third metal hydride reactor assembly module having a regeneration alloy and said fourth metal hydride reactor assembly module having a refrigeration alloy, said third metal hydride reactor assembly module coupled to said fourth metal hydride reactor assembly module for exchange of hydrogen;
an ambient air inlet adapted to receive an ambient air stream into a housing to be fed to at least one of said first and said third metal hydride reactor assemblies;
a fluid recirculation circuit configured to recirculate an exhaust stream as received from one of said metal hydride reactor assembly modules, said fluid recirculation circuit comprises:
a mixer adapted to mix a portion of said recirculation stream and said exhaust stream to provide a resultant stream having a temperature, intermediate of the temperature of said exhaust stream and the temperature of said recirculation stream;
a fluid flow switching circuit including at least one valve coupled to said mixer and adapted to switch flow of said resultant stream as received from said mixer and said ambient air stream in a cyclic manner in a series of half-cycles of operation wherein in one half cycle of operation, said resultant stream is fed to said third metal hydride reactor assembly module and said ambient air stream is fed to said fourth metal hydride reactor assembly module and in a subsequent half-cycle of operation, said resultant stream is fed to said first metal hydride reactor assembly module and said ambient air stream is fed to said second metal hydride reactor assembly module;
a flow regulator including a fan provided downstream of said metal hydride reactor assembly modules; and
an exhaust outlet for leading away a portion of said recirculation stream from said housing.

2. The regeneration system as claimed in claim 1, wherein said second and said fourth metal hydride reactor assembly modules, in the first and the second half-cycles respectively, are coupled to a chamber to be cooled and operate in a hydrogen desorption mode.

3. The regeneration system as claimed in claim 2, wherein said first and said third metal hydride reactor assembly modules, in the first and the second half-cycles respectively, operate in a hydrogen absorption mode atm discharge heat of absorption to a stream of ambient air.

4. The regeneration system as claimed in claim 1, wherein direction of flow of ambient air is opposite to the direction of flow of exhaust gases through each of said first, second, third and fourth metal hydride reactor assembly modules.

5. The regeneration system as claimed in claim 1, wherein said fluid stream switching means is a fluid flow circuit comprising one 4-port 2 position valve and two 3-port 2 position valves.

6. The regeneration system as claimed m claim 1, wherein said fluid stream switching means is a fluid flow circuit comprising two 4-port 2 position valves.

7. The regeneration system as claimed in claim 1, wherein said flow regulating means is configured to control the flow rate of said recirculation stream in relation to the flow rate of said exhaust stream.

8. The regeneration system as claimed in claim 1, wherein said first metal hydride reactor assembly module is coupled to said second metal hydride reactor assembly module and said second metal hydride reactor assembly module is coupled to said fourth metal hydride reactor assembly module through a hydrogen tubing.

* * * * *